(12) United States Patent
Rauer et al.

(10) Patent No.: US 8,604,414 B2
(45) Date of Patent: Dec. 10, 2013

(54) DIAGNOSIS OF RADIOMETRIC DETECTORS

(75) Inventors: Winfried Rauer, Fischerbach (DE); Josef Fehrenbach, Haslach (DE); Ralf Koernle, Zell a.H. (DE)

(73) Assignee: VEGA Grieshaber KG, Wolfach (DE)

( * ) Notice: Subject to any disclaimer, the term of this patent is extended or adjusted under 35 U.S.C. 154(b) by 301 days.

(21) Appl. No.: 13/080,143

(22) Filed: Apr. 5, 2011

(65) Prior Publication Data

US 2012/0085142 A1 Apr. 12, 2012

Related U.S. Application Data

(60) Provisional application No. 61/323,647, filed on Apr. 13, 2010.

(30) Foreign Application Priority Data

Apr. 13, 2010 (EP) ...................................... 10159755

(51) Int. Cl.
  *G01D 18/00* (2006.01)
(52) U.S. Cl.
  USPC ....................................................... 250/252.1

(58) Field of Classification Search
  None
  See application file for complete search history.

(56) References Cited

U.S. PATENT DOCUMENTS

| | | | |
|---|---|---|---|
| 5,218,202 A | 6/1993 | Evers | |
| 5,591,967 A * | 1/1997 | Moake | 250/252.1 |
| 2010/0270472 A1 * | 10/2010 | Proksa et al. | 250/371 |

FOREIGN PATENT DOCUMENTS

| | | |
|---|---|---|
| DE | 4114030 | 9/1992 |
| DE | 19711124 | 11/1997 |
| DE | 10048559 | 4/2002 |

* cited by examiner

*Primary Examiner* — Robert R Raevis
(74) *Attorney, Agent, or Firm* — Fay Kaplun & Marcin, LLP

(57) ABSTRACT

Described is diagnosing radiometric detectors. The pulse amplitudes of the pulses acquired by the radiometric detector can be measured and stored temporarily. The pulse amplitude distribution determined in this manner is compared to a reference amplitude distribution, whereby error diagnosis and, if applicable, recalibration of the measuring device are made possible. In this manner temperature drifts and damage to the scintillator, EMC radiation and an increased rate of dark pulses of the photosensitive component may be detected and corrected.

12 Claims, 5 Drawing Sheets

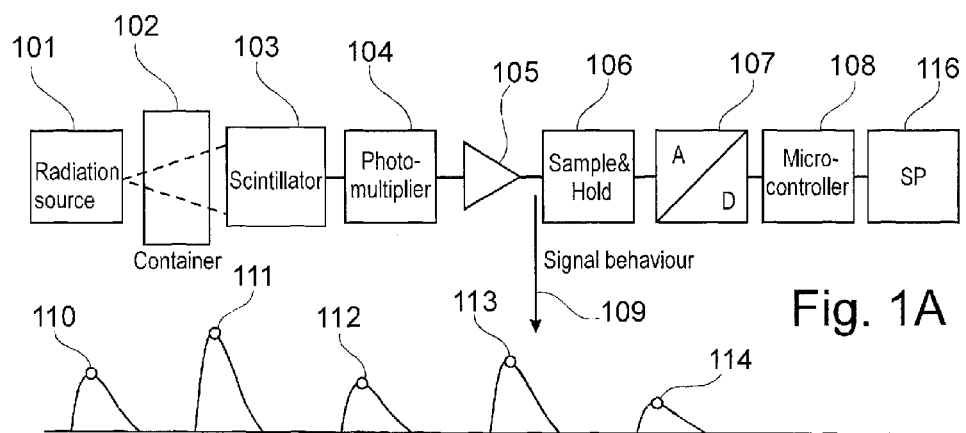
Fig. 1A
Fig. 1B
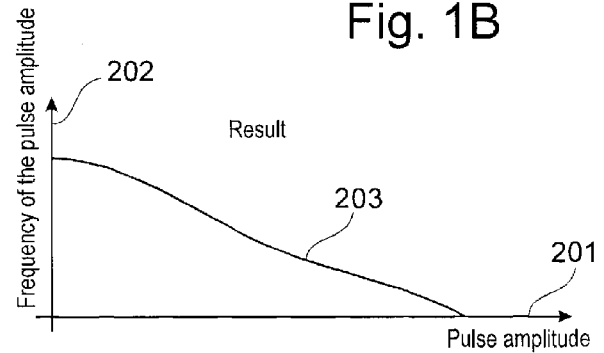
Fig. 2
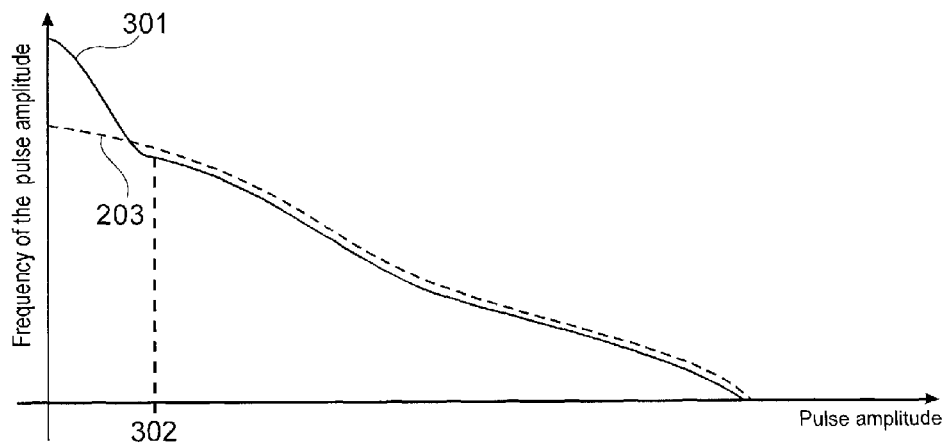
Fig. 3

US 8,604,414 B2

DIAGNOSIS OF RADIOMETRIC DETECTORS

PRIORITY CLAIM

This application claims the benefit of the filing date of EP Patent Application Serial No. EP 10 159 755.7 filed 13 Apr. 2010 and U.S. Provisional Patent Application Ser. No. 61/323,647 filed 13 Apr. 2010, the disclosure of both application is hereby incorporated by reference.

FIELD OF THE INVENTION

The present invention relates to radiometric fill-level measuring, radiometric density measuring and radiometric throughput measuring. In particular, the invention relates to a diagnostic device for a radiometric detector, in particular for a radiometric fill level detector, a radiometric density detector and/or a radiometric throughput detector. Furthermore, the invention relates to a radiometric fill-level measuring device with a diagnostic device, a radiometric density measuring device with a diagnostic device, and a radiometric throughput measuring device with a diagnostic device, as well as to a method for diagnosing a radiometric detector.

BACKGROUND INFORMATION

Radiometric measuring devices use a comparator in order to count pulses. Changes in amplitude, which may be caused by temperature drift, may lead to changes in the frequency distribution of the measured pulses. This may result in falsification of the measurement results.

SUMMARY OF THE INVENTION

Stated are a diagnostic device for a radiometric detector, in particular for a fill-level measuring device, a density measuring device and/or a throughput measuring device, a radiometric fill-level measuring device with such a diagnostic device, a radiometric density measuring device with such a diagnostic device, a radiometric throughput measuring device with such a diagnostic device, as well as a method for diagnosing a radiometric detector.

The exemplary embodiments described equally relate to the diagnostic device, to the complete measuring devices and to the method. In other words, characteristics which below are described for example in relation to the diagnostic device may also be implemented in the measuring devices and in the method and vice versa.

According to a first exemplary aspect of the present invention, a diagnostic device for a radiometric detector is stated, which diagnostic device comprises an amplitude measuring unit and a comparator unit. The amplitude measuring unit is designed to obtain information relating to the amplitudes of the pulses measured by the detector, wherein the comparator unit is designed to compare the information obtained in this way with reference values and to perform an error diagnosis, for example based on this comparison.

This may improve the accuracy of the measurement results of radiometric detectors.

For example, the amplitude of each individual pulse of a scintillator is measured. This may make it possible to carry out a diagnosis that can detect the following effects:
  increased rate of dark pulses of the photosensitive component (photomultiplier, photo diode or the like);
  EMC irradiation;
  temperature drift;
  damage to the scintillator.

It may thus be possible to carry out compensation of any measurement errors more quickly, more accurately and more reliably.

According to a further exemplary aspect of the invention, stated is a radiometric fill-level measuring device with a radiometric detector and a diagnostic device described above and below.

According to a further aspect of the invention, stated is a radiometric density measuring device with a radiometric detector and a diagnostic device described above and below.

According to a further aspect of the invention, stated is a radiometric throughput measuring device with a diagnostic device described above and below as well as with a radiometric detector.

According to a further aspect of the invention, a method for diagnosing a radiometric detector is stated, by means of which method it is possible to detect falsification of measured values. In this method information relating to the amplitudes of the pulses measured by the detector is obtained. From this information obtained, conclusions relating to any falsification of the measured values are then drawn in that the information obtained is compared to reference values which have, for example, been stored in the factory.

It may be considered a key aspect of the invention for the measured pulses to be analysed with regard to their amplitudes. The amplitude distribution obtained in this manner is then compared to a reference distribution, after which error diagnosis and, if applicable, troubleshooting can be carried out. For troubleshooting it is possible, for example, to carry out automatic displacement of the trigger threshold in the measured-value channel or automatic recalibration of the measuring device.

Below, exemplary embodiments of the invention are described with reference to the figures.

BRIEF DESCRIPTION OF DRAWINGS

FIG. 1A shows a measuring device according to an exemplary embodiment of the present invention.

FIG. 1B shows possible pulses measured by the measuring device.

FIG. 2 shows an amplitude distribution of a scintillator, for example of an organic plastic scintillator.

FIG. 3 shows an amplitude distribution of a scintillator with an increased frequency (i.e. occurrence) of low pulse amplitudes.

DETAILED DESCRIPTION

Figure 4:
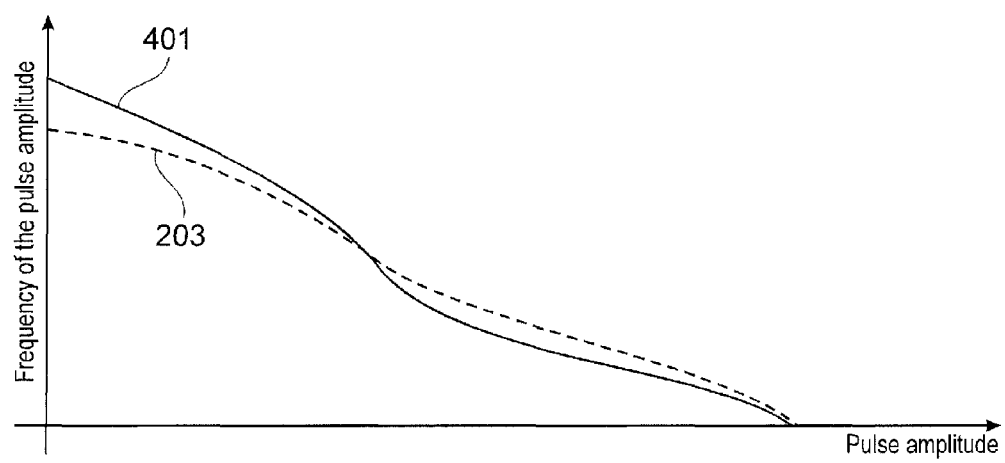
FIG. 4 shows an amplitude distribution of a scintillator, which amplitude distribution has shifted towards lower levels.

The illustrations in the figures are diagrammatic and not to scale.

In the following description of the figures the same reference characters are used for identical or similar elements.

FIG. 1 shows a radiometric measuring device according to an exemplary embodiment of the invention. The measuring device, which is, for example, a radiometric fill-level measuring device, a radiometric density measuring device and/or a radiometric throughput measuring device, comprises a radioactive radiation source 101 that transmits radiation through the container 102, which contains, for example, feed material. Behind the container there is the radiometric detector, which is a scintillator 103 and a photomultiplier 104 connected to the aforesaid, as well as an amplifier 105.

The scintillator 103 converts gamma radiation to light pulses of variable intensity. The scintillation process can be triggered by the Compton effect or the photo effect. The intensity distribution of the light pulses resulting in this manner is determined by the scintillation material and is thus known.

Downstream of the amplifier 105 the signal behaviour of the resulting pulses can be tapped and analysed. This is indicated by the arrow 109. In the measured-value channel downstream of the amplifier 105 there is a sample-and-hold component 106 for scanning the pulses.

After scanning the pulses by means of the sample-and-hold component 106, analogue-to-digital conversion is carried out by means of the analogue-to-digital converter 107 which feeds the resulting digital signals to a microprocessor 108. Furthermore, a storage unit 116 can be provided, which is, for example, connected to a microprocessor 108.

FIG. 1B shows an example of measured pulses. Each of the five pulses comprises a pulse amplitude 110, 111, 112, 113 or 114. The axis 115 indicates the time axis.

If in a radiometric measuring device two comparators with different trigger thresholds are used, it becomes possible to check whether high pulses are present in the expected numbers. Consequently, two points from the amplitude distribution of the pulses are known. This makes it possible to detect and compensate for changes in the pulse amplitudes as long as said changes are caused by pure amplification changes (temperature drifts). However, further-reaching diagnostics require additional measures.

FIG. 2 shows a typical amplitude distribution of an organic plastic scintillator in which predominantly the Compton effect is responsible for scintillation. The axis 201 shows the pulse amplitude, while the axis 202 shows the frequency of the corresponding pulse amplitude. The curve 203 shows the amplitude distribution.

According to an exemplary embodiment of the invention, the diagnostic device can obtain information relating to the amplitudes of the pulses measured by the detector, which information is then compared to reference values stored in the factory.

These reference values correspond, for example, to a reference amplitude distribution.

In particular, it may be possible for the information obtained to correspond to the measured amplitudes of the pulses measured by the detector. For example, the diagnostic device (or the radiometric measuring device that comprises the diagnostic device) thus measures the amplitude of each pulse and stores this amplitude. Consequently, the amplitude distribution of the pulses can be displayed quickly and simply.

In particular, the diagnostic device may be designed to determine whether the amplitude of a pulse measured by the detector is above a preset threshold. In a simple case it may thus be possible to detect whether low pulse amplitudes occur more frequently, as is shown in the case of FIG. 3. Instead of evaluating all the pulse amplitudes it may in this example already be sufficient to set a trigger threshold at point 302 and to count the pulses whose pulse amplitudes are above the trigger threshold 302, and, furthermore, to count those pulses whose amplitudes are below the trigger threshold 302. In this case there may be no need to measure the precise pulse amplitude distribution 301.

By means of a comparison of the actual pulse distribution 302 with the pulse distribution 203 that has been stored, for example in the factory, it is possible to engage in diagnostic activities. Furthermore, it is also possible to store the reference distribution 203 locally by the user, for example after the measuring device has been installed at its allocated measurement location. Moreover, various reference distributions 203 can be stored that correspond to various measurement scenarios. Users themselves can then select the suitable reference distribution.

A considerable increase in low pulse amplitudes can be caused by self-generated pulses of the photomultiplier (PMT), by the so-called dark pulses. It is also possible for electrical disturbance, for example as a result of EMC influences, to cause this. By increasing the trigger threshold of the measured-value channel these pulses can be masked out. The measured counting rate is reduced as a result of an increase in the trigger threshold, and thus the measured value of the device. However, this can be compensated for by means of the stored pulse distribution 203. Thus, measuring at limited accuracy continues to be possible.

A general reduction in the pulse amplitude, in other words a shift in the pulse amplitude towards low levels, can be caused by ageing or by damage to the photomultiplier or to the scintillator. Such a shift is shown in FIG. 4 (see amplitude distribution 401).

Since both the PMT and many scintillators are temperature-dependent, a general reduction in the pulse amplitude can also be caused by a change in the ambient temperature. The device can counteract such a reduction in the pulse amplitude in that the amplification of the amplifier 105 is increased, or in that the amplification of the photo-sensitive component, e.g. the photomultiplier 104, is increased. This can take place, for example, by increasing its high tension. Furthermore, the trigger threshold can be reduced in order to compensate for the reduction in the pulse amplitude. If the reduction of the pulse amplitude takes place to such an extent that it can no longer be caused by ambient conditions, this would indicate ageing of, or damage to, the photomultiplier or the scintillator. The device can subsequently display this by means of an error message.

Figure 5:
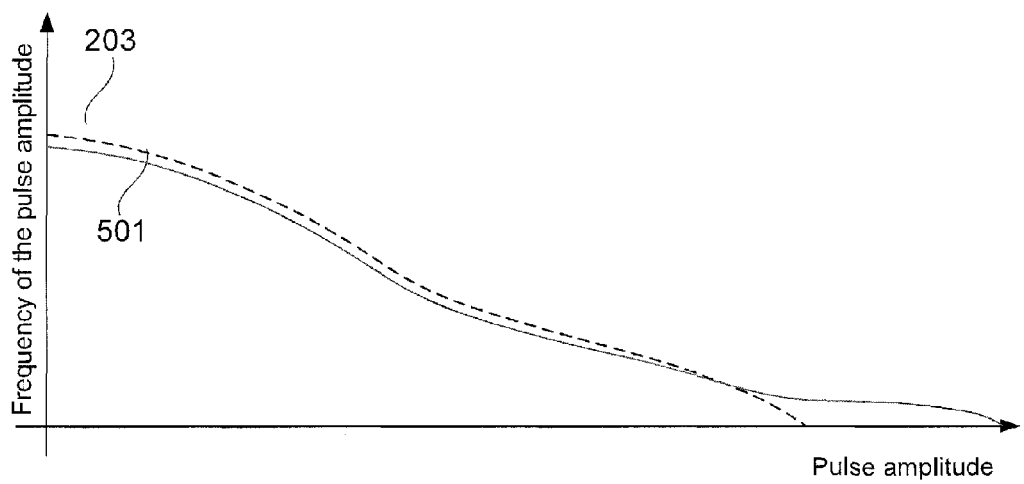
FIG. 5 shows an amplitude distribution of a scintillator, in which amplitude distribution the high pulse amplitudes have increased.

FIG. 5 shows a pulse amplitude distribution 501 in which the frequency of high pulse amplitudes is increased when compared to the reference distribution 203. An increase in high pulse amplitudes can arise as a result of an increase in background radiation when the background radiation contains high-energy gamma radiation. This effect can be reduced in that the high signal levels are not used for measuring, or in that the number of high levels is subtracted from the overall number. In other words, the pulses with high pulse amplitudes can be rejected or deleted.

Figure 6:
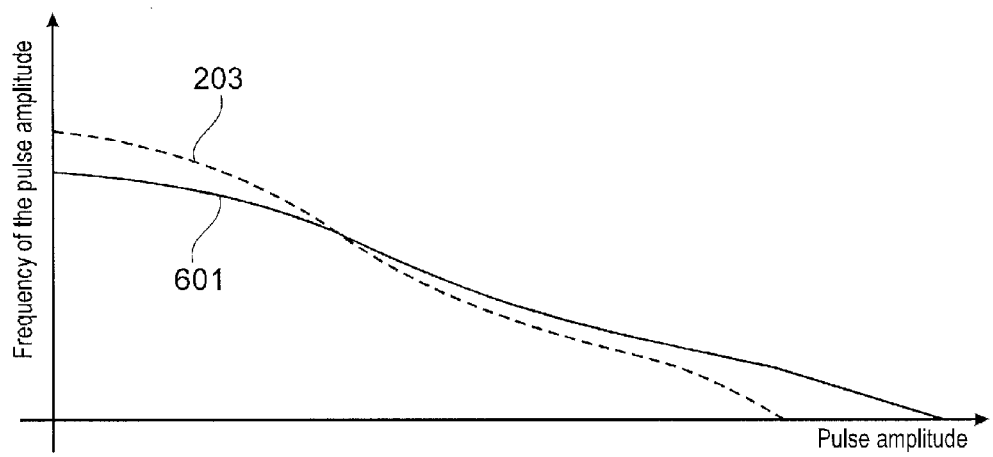
FIG. 6 shows an amplitude distribution of a scintillator, in which amplitude distribution the frequency of the pulse amplitudes is generally increased.

FIG. 6 shows a pulse amplitude distribution 601 in which the pulse amplitudes are generally increased. A general increase in the pulse amplitude can to a small extent be caused by a change in ambient temperature because the photomultiplier or the photo diode and many scintillators are temperature-dependent. Large changes would indicate a defect in the electronics. As a result of an uncontrolled increase in the voltage supply for the photomultiplier or for the photodiode the pulse amplitude can generally become larger. The device can counteract this increase in the pulse amplitude in that the amplification of the amplifier 105 is reduced, or in that the amplification of the photo-sensitive component, e.g. the photomultiplier 104, is reduced. This can, for example, take place by a reduction in its high tension. Furthermore, the trigger threshold can be increased in order to compensate for the increase in the pulse amplitude. If the extent of the increase in the pulse amplitude is such that it can no longer be caused by ambient conditions, this would indicate damage to the electronics. The device can subsequently display this by means of an error message.

Figure 7:
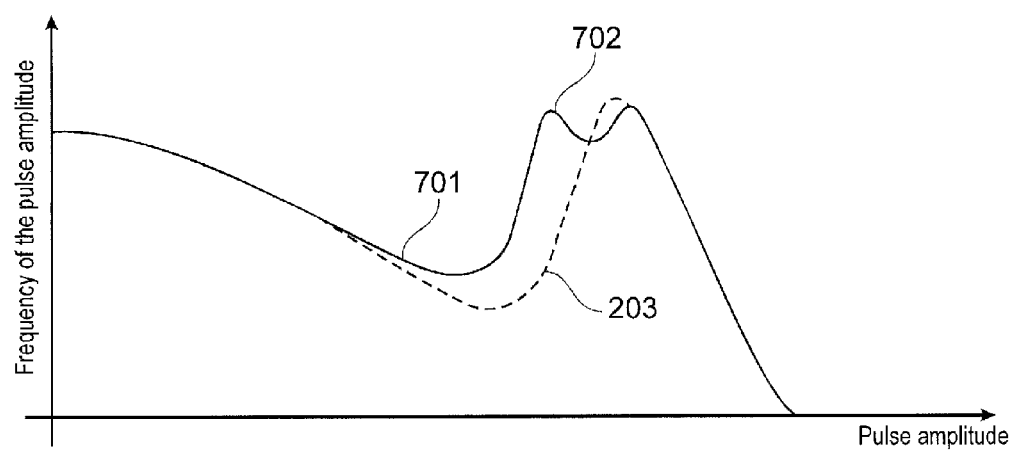
FIG. 7 shows an amplitude distribution of a scintillator with a widened photo peak.

FIG. 7 shows a pulse amplitude distribution 701 in which the photo peak 702 is widened when compared to the reference curve 203. Many inorganic scintillators, which comprise, for example, NaJ, relatively frequently produce high pulse amplitudes. This photo peak arises as a result of the photo effect in which gamma quanta release all their energy to the scintillator material. Distinctive widening of the photo peak occurs if the scintillator is damaged. This can, for example, take place as a result of thermal shock in which the scintillator material can fracture.

If widening of the photo peak is detected, it is possible, for example, to recalibrate. If widening is very pronounced, this would indicate a defective scintillator. The device can subsequently display this by means of an error message.

It should be noted that the measuring device can be designed in such a manner that measuring the pulses and the subsequent evaluation of the pulse amplitudes takes place by means of a comparison with the reference value at predeterminable time intervals, for example weekly or daily. Such a diagnosis can also be triggered by defined events, for example by a strong fluctuation in temperature or some other strong (e.g. rapid) change in the measurement environment.

Figure 8:
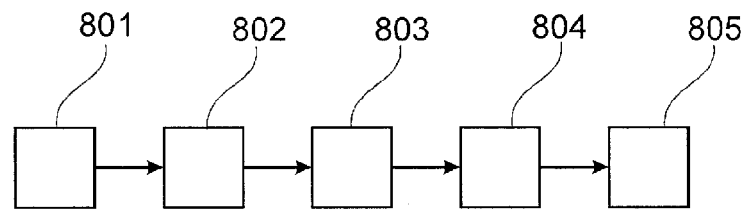
FIG. 8 shows a flow chart of a method according to an exemplary embodiment of the invention.

FIG. 8 shows a flow chart of a method according to an exemplary embodiment of the invention. In step 801 gamma quanta are radiated by the radioactive source 101 in the direction of the container. In step 802 these gamma quanta encounter a scintillator and are converted to light flashes which are converted to electrical pulses by a photomultiplier. In step 803 the amplitudes of these pulses are measured, and in step 804 they are compared to a reference pulse-amplitude distribution. This takes place, for example, in a comparator unit. In step 805 a correction of the measured data or recalibration of the measuring device can take place. To this effect a correction unit is provided.

Figure 9:
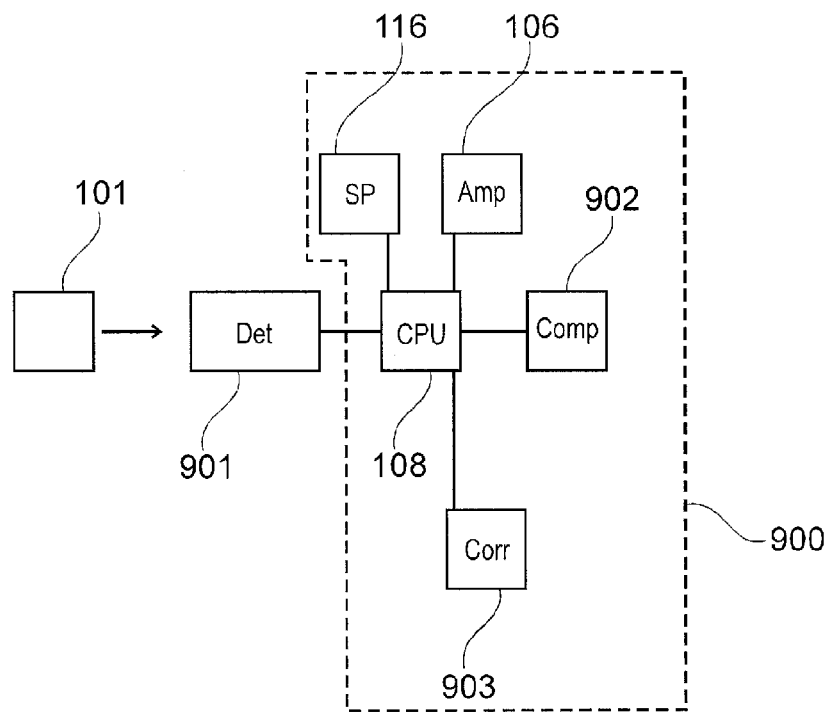
FIG. 9 shows a radiometric measuring device according to an exemplary embodiment of the invention.

FIG. 9 shows a radiometric measuring device with a source 101, a detector 901 and a diagnostic device 900. The diagnostic device 900 comprises an arithmetic unit 108. A storage unit 116 is connected to the control unit 108, on which storage unit 116 the measured amplitudes and the reference distribution are stored. Furthermore, an amplitude measuring unit 106, a comparator unit 902 and a correction unit 903 are provided which are also connected to the control unit 108.

The comparator unit 902 is used to generate diagnostic data on the basis of the comparison, carried out by the comparator unit, with the reference values. By means of the generated diagnostic data it is possible for the correction unit 903 to correct the measurement results of the detector 901, for example in that a trigger threshold of the measured-value channel of the detector is increased. It is also possible for the pulses with a signal amplitude above a pre-set threshold value to be rejected or subtracted. Likewise it is possible for recalibration of the detector to be carried out on the basis of the comparison.

For the purpose of detecting the radioactive radiation the radiometric sensor 901, 900 can use a scintillator with a downstream photomultiplier or a photodiode. By means of the diagnostic device 900 it is also possible to carry out diagnosis on Geiger-Müller counting tubes.

It should be noted that the various components (the control device 108, the amplitude measuring unit 106, the comparator unit 902 and/or the correction unit 903) can also be subsumed in a module (for example in the CPU 108).

Figure 10:
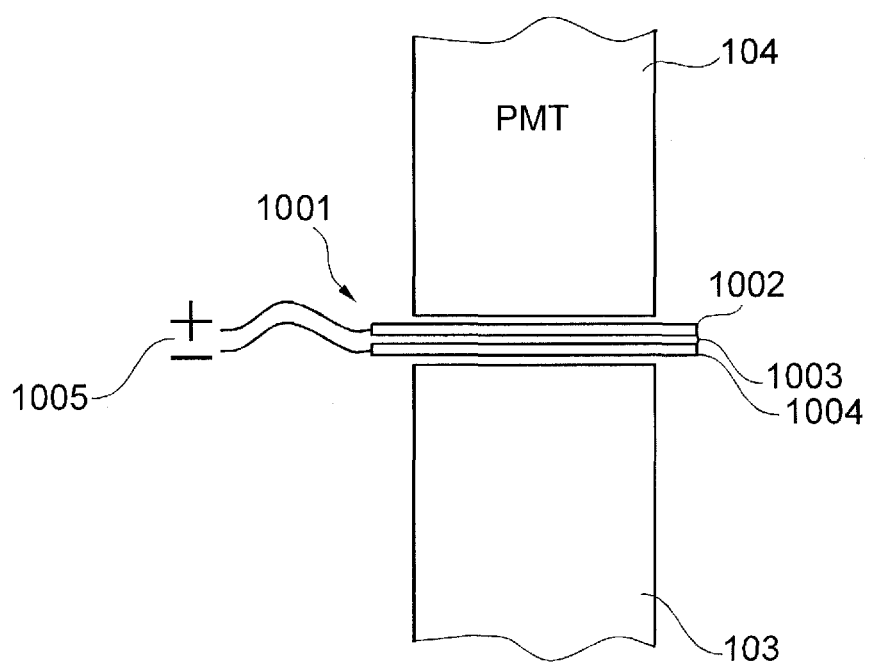
FIG. 10 shows a part of the diagnostic device according to an exemplary embodiment of the present invention.

FIG. 10 shows a part of the diagnostic device according to an exemplary embodiment of the present invention. This part 1001 of the diagnostic device depicted in FIG. 10 comprises two transparent sheets 1002, 1004 between which a layer of liquid crystal 1003 is arranged. For example, the arrangement 1001 may also be called switchable light blocker and may be adapted in form of a liquid crystal display.

The transparent, e.g. glass sheets 1002 and 1004 each comprise a polarization filter, wherein the polarization planes of the two polarization filters are identical, such that light can pass from the scintillator 103 through the arrangement 1001 to the photomultiplier 104.

By applying a voltage 1005 to the upper and lower sides of the liquid crystal layer 1003 the polarization of the light travelling through the liquid crystal layer is rotated. In case the polarization plane of the light is rotated by 90° most of even all of the light can not pass the upper polarization filter.

Thus, by arranging the arrangement 1001 between the scintillator 103 and the photomultiplier 104 of the radiometric detector it is possible to essentially block the light travelling from the scintillator to the photomultiplier.

In case the arrangement 1001 blocks the light from the scintillator, only dark pulses, which may be generated by the photomultiplier, are transmitted to the circuit 105, 106, 107, 108, 116 (see FIG. 1A) for further processing and/or evaluation. Based on this evaluation, the error diagnosis and/or correction may be performed.

After thus having detected the actual rate of dark pulses the voltage 1005 can be switched off, thereby allowing light to travel from the scintillator 103 through the switchable light blocker 1001 to the photomultiplier 104, and thus allowing to continue for example filling level determination.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A diagnostic device for a radiometric detector, comprising:
    an amplitude measuring unit configured for obtaining information relating to amplitudes of pulses measured by the detector;
    a comparator unit configured for comparing the obtained information with reference values and for performing an error diagnosis on the basis of the comparison;
    a correction unit;
    wherein the comparator unit is configured to generate diagnostic data on the basis of the comparison, carried out by the comparator unit,
    wherein the correction unit is configured to correct a measurement result of the detector on the basis of the diagnostic data, and
    wherein the correction unit is configured to change a trigger threshold of a measured-value channel of the detector.

2. The diagnostic device according to claim 1, wherein the reference values correspond to a reference amplitude distribution.

3. The diagnostic device according to claim 1, wherein the obtained information corresponds to a measured amplitude of the pulses measured by the detector.

4. The diagnostic device according to claim 1, wherein the amplitude measuring unit is configured to determine the amplitude of each pulse measured by the detector.

5. The diagnostic device according to claim 1, wherein the amplitude measuring unit is configured to determine whether the amplitude of a pulse measured by the detector is above a preset threshold.

6. The diagnostic device according to claim 1, further comprising:
a storage unit storing the reference values.

7. The diagnostic device of claim 1, wherein the correction unit is configured to recalibrate the detector.

8. A diagnostic device for a radiometric detector, comprising:
an amplitude measuring unit configured for obtaining information relating to amplitudes of pulses measured by the detector;
a comparator unit configured for comparing the obtained information with reference values and for performing an error diagnosis on the basis of the comparison;
a correction unit;
wherein the comparator unit is configured to generate diagnostic data on the basis of the comparison, carried out by the comparator unit,
wherein the correction unit is configured to correct a measurement result of the detector on the basis of the diagnostic data, and
wherein the correction unit is configured to reject pulses with a signal amplitude above a pre-set threshold value.

9. A diagnostic device for a radiometric detector, comprising:
an amplitude measuring unit configured for obtaining information relating to amplitudes of pulses measured by the detector;
a comparator unit configured for comparing the obtained information with reference values and for performing an error diagnosis on the basis of the comparison; and
a switchable light blocker arranged between a scintillator and a photomultiplier of the detector.

10. A measuring device, comprising:
a radiometric detector;
a diagnostic device including an amplitude measuring unit configured for obtaining information relating to amplitudes of pulses measured by the measuring unit; and a comparator unit configured for comparing the obtained information with reference values and for performing an error diagnosis on the basis of the comparison;
a correction unit;
wherein the comparator unit is configured to generate diagnostic data on the basis of the comparison, carried out by the comparator unit,
wherein the correction unit is configured to correct a measurement result of the detector on the basis of the diagnostic data, and
wherein the correction unit is configured to change a trigger threshold of a measured-value channel of the detector.

11. The measuring device of claim 10, wherein the measuring device is one of a radiometric fill-level measuring device, a radiometric density measuring device, and a radiometric throughput measuring device.

12. A method for diagnosing a radiometric detector, comprising the steps of:
obtaining information relating to amplitudes of pulses measured by the detector;
comparing the obtained information to reference values;
performing an error diagnosis on the basis of the comparison;
generating diagnostic data on the basis of the comparison carried out by a comparator unit;
correcting a measurement result of the detector on the basis of the diagnostic data; and
changing a trigger threshold of a measured-value channel of the detector.

* * * * *